United States Patent [19]

Tarvin

[11] 4,093,257
[45] June 6, 1978

[54] TRUCK LADDER

[76] Inventor: Larry G. Tarvin, R.R. 2, Havana, Ill. 62624

[21] Appl. No.: 812,401

[22] Filed: Jul. 1, 1977

[51] Int. Cl.² .............................................. B60r 3/02
[52] U.S. Cl. ...................................... 280/166; 182/89
[58] Field of Search ................... 280/166; 182/89, 88, 182/95, 98

[56] References Cited

U.S. PATENT DOCUMENTS

| 1,118,584 | 11/1914 | Roebuck | 182/88 |
|---|---|---|---|
| 2,246,986 | 6/1941 | Pellegrini | 182/95 |
| 2,670,968 | 3/1954 | Duffy | 182/89 |
| 3,068,958 | 12/1962 | McCann | 182/89 |
| 3,833,240 | 9/1974 | Weiler | 280/166 |

*Primary Examiner*—Robert R. Song
*Attorney, Agent, or Firm*—Burns, Doane, Swecker & Mathis

[57] ABSTRACT

A truck ladder assembly for attachment to the underside of a truckbed includes a ladder portion movable between a first operable position providing easy access to the truckbed and a second collapsed position providing an unobstructive storage of the ladder portion. The truck ladder assembly includes a mounting frame and a ladder portion having stabilizer arms and unlatching levers. The mounting frame is attached to the underside of the truckbed with the ladder portion pivotably attached to the mounting frame by a pair of spacing members extending at right angles to the ladder portion. First and second stabilizer arms, which are pivotably attached to the ladder portion, each include a pair of notches that releasably engage the mounting frame. First and second release levers pivotably attached to the ladder portion are provided in close proximity to the stabilizer arms to facilitate the disengagement of the stabilizer arms from the mounting frame. The weight of the ladder portion cooperates with the location and orientation of the notches to securely position the ladder portion in the first and second positions.

10 Claims, 5 Drawing Figures

TRUCK LADDER

BACKGROUND OF THE PRESENT INVENTION

The present invention relates generally to a ladder for facilitating access to and from a vehicle, and more specifically, concerns a folding ladder assembly suitable for attachment beneath the platform of a flatbed truck.

Many trucks now in use include a flatbed or platform portion that may be located 4 to 6 feet above the ground. Often, no specific access route is provided for climbing onto the platform, requiring truck drivers and workers to either provide a ladder for themselves or else climb onto the platform by obtaining makeshift footholds and handholds about the truck. Besides being troublesome and difficult, climbing onto a platform without the use of a suitable ladder device may be extremely dangerous, possibly resulting in injury to the climber.

Accordingly, proposals have been made for providing a ladder which is rigidly attached beneath the platform. Since such a ladder must extend fairly close to the ground in order to be useful, there may be a tendency for the ladder to strike objects rising from the roadbed. Other proposals have been made which involve the provision of ladder devices which may be folded to a raised position when not in use. Exemplary of such proposals are the following U.S. Pat. Nos. 3,833,240 issued to Weiler, 3,068,958 issued to McCann, 2,670,968 issued to Duffy, 2,246,986 issued to Pellegrini, and 1,118,584 issued to Roebuck et al.

Many of the proposals heretofore made may require numerous components which are expensive and increase the possibilities for malfunction. Some previously proposed folding ladders are not conveniently actuable by one person, but may require assistance which, of course, is not always available. Other folding ladders may not be functional in the absence of springs, toggle linkages, manually securable fasteners, etc. which can be subject to failure after repeated use.

SUMMARY OF THE INVENTION

A folding ladder assembly which overcomes the deficiencies noted above, as well as many others, includes a mounting frame and a ladder portion which is pivotably attached to the mounting frame. The ladder portion is movable between a first operable position and a second collapsed position. The ladder portion is releasably maintained in the two positions by a pair of stabilizer arms that are pivotably attached to the ladder portion. The stabilizer arms securely engage the mounting frame when the ladder portion is in either the first or second position. A pair of release levers may be pivotably attached to the ladder portion in close proximity to the stabilizer arms to facilitate disengagement of the stabilizer arms with the mounting frame.

The ladder portion may be pivotably attached to the mounting frame by a pair of spacing members which extend beyond the periphery of the platform of a flatbed truck when the ladder portion is in the first operable position. The use of the spacing members enables the ladder portion to be spaced away from the periphery of the platform by a short distance, thereby facilitating climbing onto the platform when the ladder portion is in the operable position.

The stabilizer arms may be provided with pairs of notches corresponding to the operable and collapsed positions of the ladder portion. The notches may engage a pair of pins provided on guides extending downwardly from the mounting frame. So as to eliminate the need for any springs or additional latching means, the notches are oriented so that when the ladder portion is in the collapsed position, the weight of the ladder portion provides a force sufficient to maintain the engagement of the support arms with the pins of the mounting frame. Similarly, the use of the spacing members enables the weight of the ladder portion to provide a force, when the ladder is in the operable position, sufficient to maintain the engagement of the stabilizer arms with the mounting frame.

BRIEF DESCRIPTION OF THE DRAWINGS

Many objects and advantages of the present invention will be apparent to those skilled in the art when this specification is read in conjunction with the drawings wherein like elements bear like reference numerals and wherein.

DETAILED DESCRIPTION OF THE PREFERRED EMBODIMENT

Figure 1:
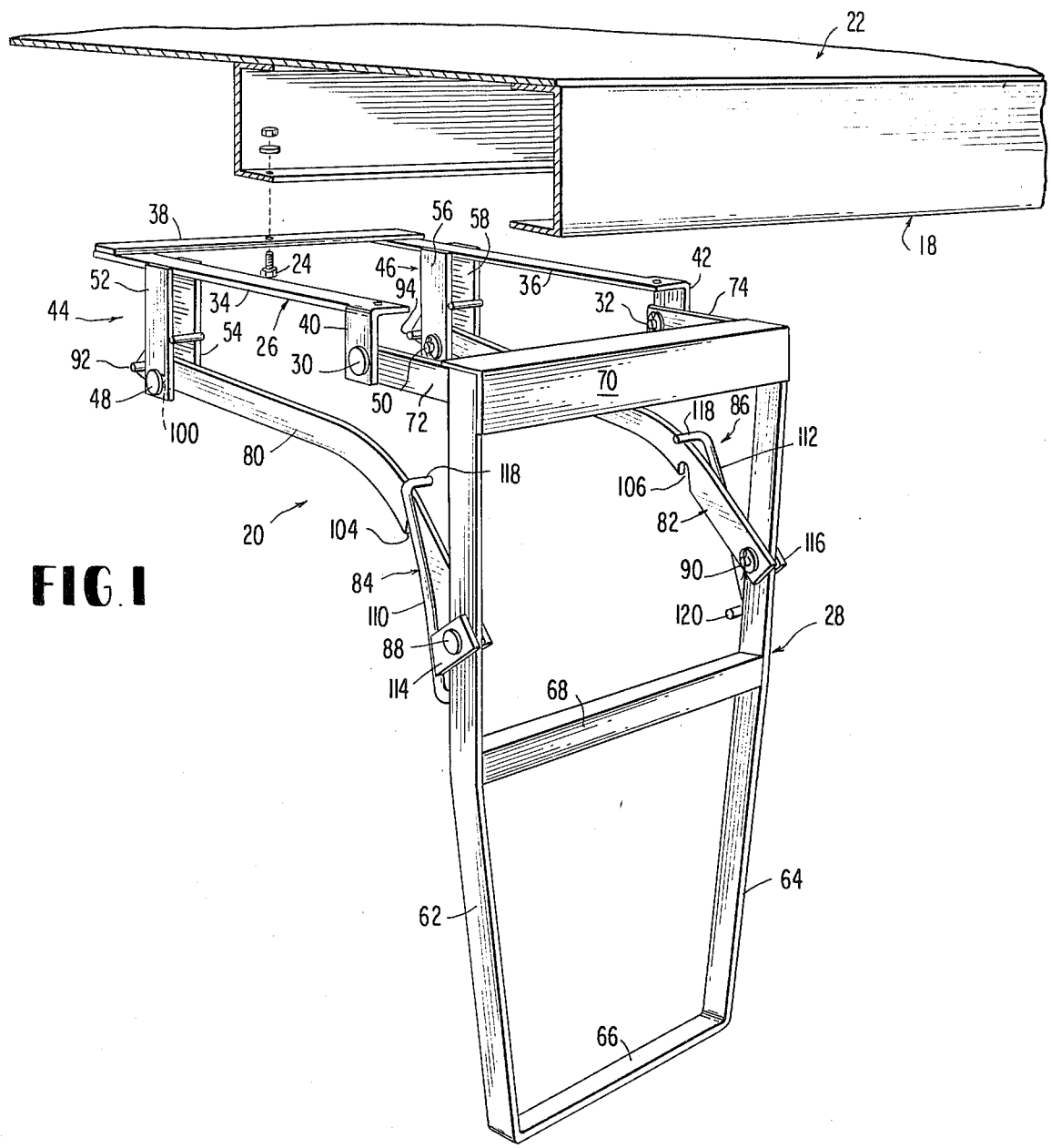
FIG. 1 is a pictorial view of a folding ladder assembly in the operable position according to the present invention.
Figure 2:
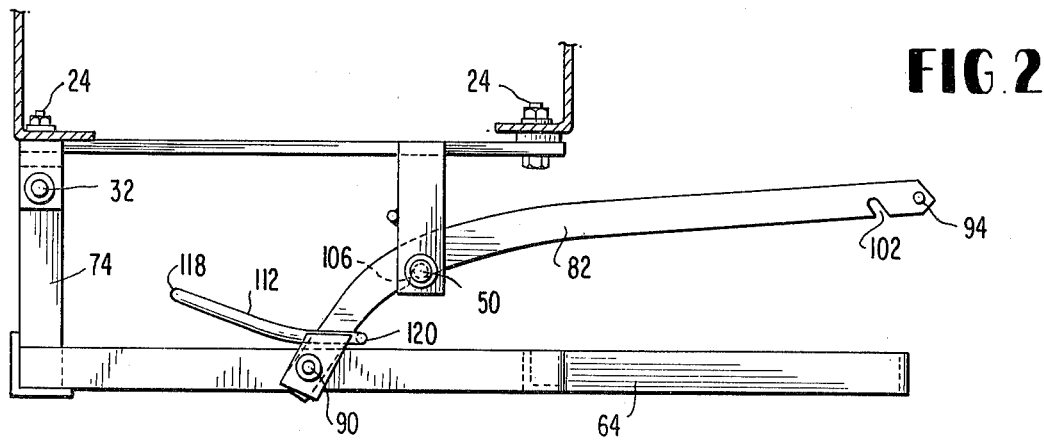
FIG. 2 is a side view of the folding ladder assembly in the collapsed position.

With reference to FIG. 1, the preferred embodiment of a folding ladder assembly 20 according to the presenting invention is depicted connected to a vehicle, preferably beneath the platform 22, or bed, of a flatbed truck. The ladder assembly 20 includes a support frame 26 (see also FIG. 3) which is secured to the underside of the platform 22, and a ladder portion 28 which is pivotably attached to the support frame 26 by a pair of pivots 30, 32. The ladder portion is pivotable about an axis extending through the pivots 30, 32 between an upright, operable position (FIG. 1) and a horizontal, collapsed position (see FIG. 2).

With reference to FIG. 1, the support frame 26 includes a pair of side members 34, 36 which are arranged parallel to one another and extend in a manner transverse to a longitudinal axis of the truck. An outer end of each of the side members 34, 36 is situated beneath and immediately adjacent an edge 18 of the platform 22 of the truck. The side members 34, 36 extend beneath the platform of the truck and are joined together at the inner ends of the members 34, 36 by an end member 38.

Figure 5:
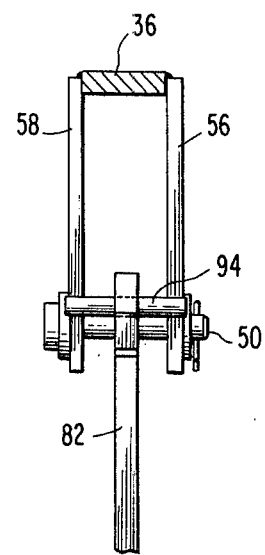
FIG. 5 is a cross-sectional view taken along line 5—5 of FIG. 4 showing a guide member of the mounting frame.

Projecting downwardly at the outer end of each of the side members 34, 36 is a flange member 40, 42 which pivotably carries the ladder portion 28 by the pivots 30, 32. A pair of guide members 44, 46, are located on the support frame between the end member 38 and the flange members 40, 42. The guide members project downwardly from the side members 34, 36 (see FIG. 5) and are each formed of a pair of flat members 52, 54, 56, 58 secured on either edge of one of the side members 34, 36. Extending between the lower ends of the flat members of each guide member is a pin 48, 50 which functions to guide and orient the ladder portion 28 as will be more fully explained below.

Preferably, all of the members of the support frame are formed of flat steel and may be welded together at suitable joints. The side members 34, 36 and the end member 38 form a rigid frame unit which may be readily secured to the underside of a platform of a truck as by welding or bolting, for example by bolts 24.

The ladder portion 28 includes a generally U-shaped peripheral frame having side members 62, 64 and parallel crosspieces 66, 68, 70. The crosspieces interconnect the side members to provide a rigid frame suitable for use as a ladder when the ladder portion is in the operative position. In this way, crosspiece 66 provides a bottom step, crosspiece 68 provides an intermediate step and crosspiece 70 provides a top step. The side members and crosspieces may be formed out of flat steel suitably welded together, with the top crosspiece 70 formed of right angle steel in order to impart substantial strength to the frame.

A pair of spacing members 72, 74 are each attached at one end to one of the side members 62, 64 at the top of the U-shaped frame. The spacing members each extend at right angles to the frame formed by the side members 62, 64 and crosspieces 66, 68, 70 and are pivotably attached to the flange members 40, 42 at the pivots 30, 32. The pivots 30, 32 are aligned with one another along an axis which is parallel to a fore-to-aft longitudinal axis of the truck.

The ladder portion further includes a pair of stabilizer arms 80, 82 which are pivotably connected at their outer ends to the side members 62, 64 by a pair of aligned pivots 88, 90. The stabilizer arms are located on the insides of the side members 62, 64. The pair of pivots 88, 90 are aligned on an axis which is parallel to the axis of pivots 30, 32 and parallel to the fore-to-aft longitudinal axis of the truck.

Figure 3:
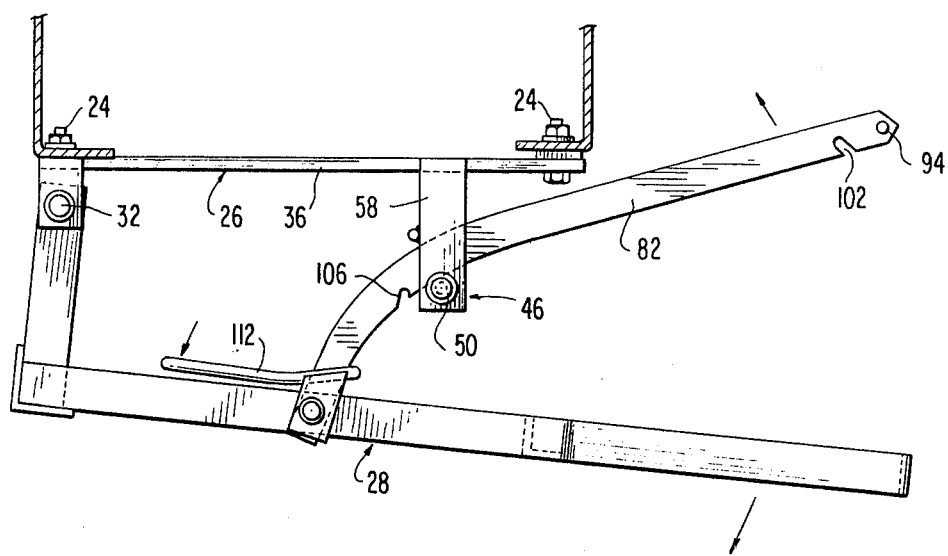
FIG. 3 is a side view of the folding ladder assembly in a position between the collapsed and operable position.

The stabilizer arms 80, 82 each have a generally elongate, curved shape with an outer end thereof being pivotably attached to the side members 62, 64, see FIGS. 1 and 3. The stabilizer arms are situated generally beneath and coplanar relative to the side members 34, 36 of the support frame. The stabilizer arms are received by the guide members 44, 46 of the support frame with a bottom edge of each of the stabilizer arms 80, 82 traveling on the pins 48, 50 when the ladder portion is moving between the operable and collapsed positions. A stop member 92, 94 including a length of steel that is longer than the spacing between the pairs of flat members 52, 54 and 56, 58 is provided at the inner end of each of the stabilizer arms 80, 82 to engage the flat members and thereby retain the arm within its respective guide member, see FIG. 5.

Each stabilizer arm 80, 82 is provided with an inner notch 100, 102 and an outer notch 104, 106 on lower edges of the stabilizer arms. The inner notches 100, 102 are located in proximity to the inner ends of the stabilizer arms and receive the pins 48, 50 when the ladder portion is in the operable position. The outer notches 104, 106 are located in proximity to the outer ends of the stabilizer arms and receive the pins 48, 50 when the ladder portion is in the collapsed position, see FIG. 2.

The inner notches 100, 102 have a generally U-shaped configuration, with the closed ends thereof being inclined outwardly, i.e., toward the edge of the platform edge 38 so that the force resulting from the weight of the ladder, or a person climbing the ladder, urges the pins 48, 50 toward the closed ends of the notches 100, 102.

The outer notches 104, 106 have a generally U-shaped configuration and are oriented so as to be essentially upright when the ladder assembly is collapsed. Thus, the force resulting from the weight of the ladder portion in the collapsed position tends to urge the pins 48, 50 toward the closed ends of the notches 104, 106.

It will be appreciated that the inner and outer notches cooperate with the pins 48, 50 to provide releasable connections between the guide members 44, 46 of the support frame and the stabilizer arms 80, 82 when the ladder portion is in the operable and collapsed positions. The stabilizer arms travel in the guide members while the ladder portion is moving between the operable and collapsed positions and are maintained within the guide members by the stop members 92, 94. The spacing between the pins 48, 50 and the cross members 34, 36 of the support frame is sufficient to enable the stabilizer arms to freely travel within the guide members without obstruction and to move up and down in a vertical manner to a limited extent.

A pair of release levers 84, 86 are provided for facilitating release of the stabilizer arms from the guide members when unfolding the ladder to an upright position. The release levers are pivotably connected intermediate their ends to the pivots 88, 90 so as to be situated to the outside of the side members 62, 64, see FIGS. 1 and 3.

The unlatching levers 84, 86 each include a generally U-shaped bar portion 110, 112 secured at a midsection thereof to a respective flange portion 114, 116. The flange portions are pivotably connected to the side members 62, 64 of the ladder portion at the pivots 88, 90. The U-shaped bar portions 110, 112 each have an upper leg end 118 which is located above the stabilizer arms 80, 82 and a lower leg 120 which is located beneath the stabilizer arms, see FIGS. 1 and 4.

When the ladder portion is in the collapsed position (FIG. 2), the stabilizer arms may be unlatched from the guide members by exerting an upward, lifting force on the frame of the ladder portion about the pivots 30, 32 and pivoting the upper legs 118 of the unlatching levers toward the side members 62, 64. In this fashion, the lower legs 120 of the unlatching levers are swung into contact with the stabilizer arms 80, 82 and raise these arms about the pivots 88, 90 to disengage the outer notches 104, 106 from the pins 48, 50, see also FIG. 3.

Figure 4:
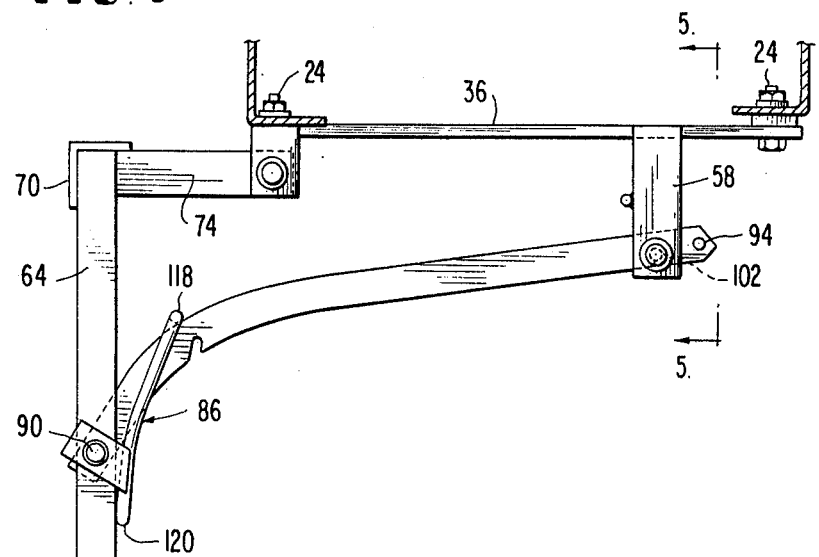
FIG. 4 is a side view of the folding ladder assembly in the operable position.

Thereafter, the ladder portion is allowed to swing downwardly about pivots 30, 32 under its own weight, enabling the stabilizer arms to slide upon the pins 48, 50, until the pins 48, 50 enter the inner notches 100, 102, see FIG. 4.

In this regard, it should be noted that the ladder portion may be permitted to swing downwardly so that the inner notches 100, 102 ride past the pins 48, 50 and the stop members 92, 94 contact the guide members 44, 46. In such a position the ladder portion will have traveled outwardly of its equilibrium position (i.e., the rest position in which it would have from the pivots 30, 32 in the absence of the stabilizer arms) and can then be allowed to swing slowly inwardly under its own weight until the inner notches 100, 102 receive the pins 48, 50 (FIG. 4). Even when the pins are received in the inner notches 100, 102, the ladder is disposed forwardly of its equilibrium position. Thus, the weight of the ladder portion will tend to maintain the pins against the closed ends of the inner notches.

The ladder portion is maintained in the collapsed and operable positions by the forces resulting from the weight of the ladder portion acting about the pivots 30, 32. The forces act in directions which tend to urge the pins 48, 50 into the notches of the stabilizer arms.

The move the ladder portion into the collapsed position, the stabilizer arms are moved in an upward direction about the pivots 88, 90 by lifting the stabilizer arms. The lifting disconnects the stabilizer arms from the guide members by disengaging the notches 100, 102 from the pins 48, 50. While the stabilizer arms are lifted above the pins, the ladder portion is swung towards the guide members. As soon as the pins 48, 50 become relocated between the notches 100, 102 and the pivots 88, 90, the stabilizer arms may be permitted to travel on the pins 48, 50. As soon as the ladder has been moved sufficiently beyond the collapsed position, the ladder portion may be permitted to move downwardly, in the opposite direction to automatically engage the notches 104, 106 in the pins 48, 50. The ladder portion will now be maintained in the collapsed position by reason of the force resulting from the weight of the ladder portion about the pivots 30, 32.

It should be apparent that there has been provided in accordance with the present invention a folding ladder for attachment to the underside of a flatbed truck which is readily movable between a first useful position and a second storage position. Moreover, it will be apparent to those skilled in the art that numerous modifications, variations, substitutions and equivalents may be made for the features of the invention without departing from the spirit and scope of the invention. Accordingly, it is expressly intended that all such modifications, variations, substitutions and equivalents which fall within the spirit and scope of the invention are defined in the appended claims being embraced thereby.

What is claimed is:

1. A ladder assembly securable to a platform of a truck for manual actuation between a collapsed position and an operable position facilitating access to and from the platform, said ladder assembly comprising:

support means including mounting means securable beneath the platform adjacent one side thereof, and guide means securable beneath the platform at a location disposed inwardly of said mounting means, and a ladder portion comprising:

a ladder frame including a plurality of crosspieces, connectible adjacent one end thereof to said mounting means for swinging movement about a horizontal axis between a generally upright operable position in which said crosspieces are vertically spaced to form climbing steps, and a generally horizontal collapsed position in which said ladder frame is disposed beneath the platform, stabilizer arm means pivotably connected at one end to said ladder frame and slidably carried by said guide means during swinging movement of said frame between operable and collapsed positions, said arm means including, first connecting means disposed remotely of said one end of said arm means for automatically latchingly engaging said guide means when said frame is in an operable position to resist swinging movement of said frame, and second connecting means located proximate said one end of said arm means for automatically latchingly engaging said guide means when said frame is in a collapsed position to resist swinging movement of said frame, said stabilizer arm means being manually swingable about the pivot connection thereof with said ladder frame to disengage said first and second connecting means from said guide means and permit swinging movement of said ladder frame, and unlatching means mounted to said ladder frame for movement relative to said ladder frame and said stabilizer arm means, said unlatching means being manually movable and including a portion engageable with said stabilizer arm means to pivot said arm means in a manner disengaging said second connecting means from said guide means to allow said ladder frame to be swung to the operable position.

2. A ladder assembly according to claim 1, wherein said mounting means include a U-shaped mounting frame having a pair of side mounting frame members and an end member joined together to form a single structure, the side members being disposed parallel to one another and each side member extending in a direction generally transverse of a longitudinal axis of the platform.

3. A ladder assembly according to claim 2, wherein said guide means include a pair of guide members, each guide member being provided on one of the side mounting frame members and having a pair of side guide portions which extend downwardly from the side member and are joined together at a lower end by a pin.

4. A ladder assembly according to claim 3, wherein:
said stabilizer arm means includes a pair of stabilizer arms;
said first connecting means includes a pair of first notches, each of said first notches being provided on one of said pair of stabilizer arms to releasably engage said pins of said guide members; and
said second connecting means includes a pair of second notches each of said second notches being provided on one of said pair of stabilizer arms to releasably engage said pins of said guide members.

5. A ladder assembly according to claim 4, wherein said unlatching means includes a pair of generally U-shaped members each having a flange portion attached to one of the U-shaped members at a midsection thereof, the flange portion being pivotably mounted on said frame with each of the U-shaped members disposed about a respective stabilizer arm with one end of each of the U-shaped members being above the respective stabilizer arm and one end of each of the U-shaped members being below the respective stabilizer arm.

6. A ladder assembly according to claim 5,
wherein said ladder frame includes a pair of side ladder frame members connecting each end of said crosspieces together and to said mounting means, and
wherein said stabilizer arms are each pivotably connected to a respective side ladder frame member.

7. A ladder assembly according to claim 6, wherein said ladder frame includes a pair of spacing members extending substantially perpendicular to a plane containing said ladder frame, the pair of spacing members being pivotably attached to said mounting means and rigidly connected to said ladder frame to comprise said connection between said ladder means and said mounting means.

8. A ladder assembly securable to a platform of a truck for manual actuation between a collapsed position and an operable position facilitating access to and from the platform, said ladder assembly comprising:
a support portion including:

a U-shaped mounting frame securable beneath the platform adjacent one side thereof and having a pair of side mounting frame members and an end member joined together to form a single structure, the side members being disposed parallel to one another and each side mounting frame member extending in a direction generally transverse of a longitudinal axis of the platform;

a pair of guide members each being provided on one of the side mounting frame members and having a pair of side guide portions which extend downwardly from the side mounting frame members and are joined together at a lower end by a pin; and a ladder portion including:

a ladder frame including a pair of side ladder frame members, a plurality of crosspieces connected together, and a pair of spacing members rigidly connectible adjacent one end thereof to to said ladder frame to provide a pivotable connection between said ladder frame and said U-shaped mounting frame for swinging movement about a horizontal axis between a generally upright operable position in which said crosspieces are vertically spaced to form climbing steps, and a generally horizontal collapsed position in which said frame is disposed beneath the platform;

a pair of stabilizer arms pivotably connected at one end to said ladder frame and slidably carried by said guide members during swinging movement of said ladder frame between operable and collapsed positions, said stabilizer arms including:

a pair of first notches, each of said first notches being disposed on one of said pair of stabilizer arms remotely of said one end of said arm for automatically latchingly engaging said guide member pin when said ladder frame is in an operable position to resist swinging movement of said frame, a pair of second notches, each of said second notches being disposed on one of said pair of stabilizer arms proximate said one end of said arm for automatically latchingly engaging said guide member pin when said frame is in a collapsed position to resist swinging movement of said frame, said stabilizer arms being manually swingable about the pivot connection thereof with said ladder frame to disengage said first and second pairs of notches from said guide member pins and permit swinging movement of said ladder frame; and a pair of unlatching levers mounted to said ladder frame for movement relative to said ladder frame and said stabilizer arms, said unlatching levers each having a generally U-shaped unlatching member and a flange portion attached to the U-shaped member at a midsection thereof, said unlatching members being manually movable and pivotably engaged with said stabilizer arms by said flange portions to pivot said stabilizer arms in a manner disengaging said second pair of notches from said guide member pins to allow said ladder frame to be swung to the operable position.

9. A ladder assembly securable to a platform of a truck for manual actuation between a collapsed position and an operable facilitating access to and from the platform, said ladder assembly comprising:

a support portion including a mounting frame securable beneath the platform adjacent one side thereof, and a pair of stationary guide members rigidly securable beneath the platform to the mounting assembly at a location disposed inwardly of said one side of said platform, said guide members including a pair of stationary latch elements spaced apart in the fore-to-aft direction of the truck; and a ladder portion including:

a ladder frame including a plurality of crosspieces joined together by a pair of side ladder frame members and connectible adjacent one end thereof to said mounting frame for swinging movement about a horizontal axis between a generally upright operable position in which said crosspieces are vertically spaced to form climbing steps, and a generally horizontal collapsed position in which said ladder frame is disposed beneath the platform;

a pair of stabilizer arms pivotably connected at one end to said ladder frame and slidably carried by said latch elements during swinging movement of said ladder frame between operable and collapsed positions, said arms each including, a first notch disposed remotely of said one end of said arm for automatically latchingly engaging an associated one of said latch elements when said ladder frame is in an operable position to resist swinging movement of said ladder frame, and a second notch located proximate said one end of said arm for automatically latchingly engaging an associated one of said latch elements when said ladder frame is in a collapsed position to resist swinging movement of said ladder frame, said stabilizer arms each being manually swingable about the pivot connection thereof with said ladder frame to disengage said first and second notches from said latch members and permit swinging movement of said ladder frame.

10. A ladder assembly according to claim 9 further comprising:

unlatching members pivotably mounted to said ladder frame for movement relative to said ladder frame and said stabilizer arms, said unlatching members being manually movable and including a portion engageable with said stabilizer arms to pivot said stabilizer arms in a manner disengaging said second notches of said stabilizer arms from said guide members to allow said ladder frame to be swung to the operable position.

* * * * *